United States Patent Office 3,228,951
Patented Jan. 11, 1966

---

3,228,951
3 - HYDROXY - 10,13,14,15b - TETRAMETHYL - 1,2, 3,4,4a,5,6,6a,6b,7,14,15a,15b - TETRADECAHYDRO-15H - NAPHTH[2',1':1,2] - INDENO[5,6-b]INDOLI-ZINE, ITS ESTERS, AND INTERMEDIATES THERETO
William F. Johns, Morton Grove, and Ivar Laos, Skokie, Ill., assignors to G. D. Searle & Co., Chicago, Ill., a corporation of Delaware
No Drawing. Filed July 30, 1964, Ser. No. 386,395
7 Claims. (Cl. 260—295)

The application for Letters Patent securing the invention herein described and claimed is a continuation-in-part of applicants' prior copending application, Serial No. 277,454 filed May 2, 1963.

This invention relates to certain naphthindenoindolizines, intermediates thereto, and processes for the manufacture thereof. More particularly, this invention provides new and useful chemical compounds of the formula

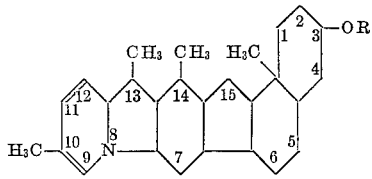

in which R represents hydrogen or an alkanoyl radical.

Among the alkanoyl radicals represented by R, especially lower alkanoyl radicals are preferred, i.e., radicals of the formula

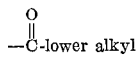

the lower alkyl constituent being methyl, ethyl, propyl, isopropyl, butyl, isobutyl, sec-butyl, tert-butyl, pentyl, neopentyl, hexyl, isohexyl, heptyl, or like monovalent, acyclic, straight- or branched-chain, saturated, hydrocarbon groupings of the formula

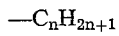

wherein $n$ represents a positive integer less than 8.

The naphthindenoindolizines to which this invention relates are useful by reason of their valuable pharmacological properties. Thus, for example they counteract edematous swelling characteristic of the inflammatory response to tissue insult.

Manufacture of the subject compounds proceeds by hydrogenating the endocyclic double bond in 3β-acetoxy-17a-methyl-5α,22β-D-homo-C-nor-18-norspirost-17(17α)-en, [Compound IX in J. Amer. Chem. Soc., 76, 4013 (1954)] over rhodium-on-alumina catalyst to give 3β-acetoxy - 17aβ - methyl - 5α,22β-D-homo-C-nor-18-norspirosten, cleaving Ring F therein by heating with octanoic acid and acetic anhydride to give 3β-acetoxy-17aβ - methyl - 26-octanoyloxy-5α,22β-D-homo-C-nor-18-norfurost-20(22)-en, cleaving Ring E therein by cold oxidation with chromium trioxide and acetic acid to give 3β - acetoxy - 17β-acetyl-17aβ-methyl-16β-(4-methyl-5-octanoyloxyvaleryloxy) - 5α - D-homo-C-nor-18-norandrostane, saponifying the ester groups therein by heating with aqueous potassium hydroxide in tert-butanol to give 17 - acetyl-17aβ-methyl-5α-D-homo-C-nor-18-norandrost-16-en-3β-ol, and esterifying the 3-alcohol function therein by heating with acetic anhydride and pyridine to give 3β - acetoxy - 17-acetyl-17aβ-methyl-5α-D-homo-C-nor-18-norandrost-16-ene. This compound is mixed with cold 6-(3-picolyl)-lithium and the resultant organometallic adduct hydrolyzed to 3β-acetoxy-17-(α-hydroxy-α,5 - dimethyl - 2 - pyridylmethyl) - 17α-methyl-5α-D-homo-C-nor-18-norandrost-16-en (a reesterification procedure being included in the work-up to restore the 3-ester group at least partially removed in process) which, in turn, is consecutively brominated with phosphorus tribromide and cyclized with triethylamine to give 3-acetoxy - 10,13,14,15b - tetramethyl - 1,2,3,4,4a,5,6,6a,6b, 7,14,14a,15a,15b - tetradecahydro - 15H-naphth[2',1':1, 2]-indeno[5,6-b]indolizine, a preferred embodiment of the instant invention. The 3-ester group therein can be saponified by heating with aqueous methanolic potassium carbonate and the resultant alcohol re-esterified ad libitum by heating with a selected alkanoic acid anhydride and pyridine.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations are referred to the D line of sodium.

EXAMPLE 1

*3β-acetoxy-17aβ-methyl-5α,22β-D-homo-C-nor-18 - norspirostan.*—A slurry of 25 parts of 5% rhodium-on-alumina in a solution of 200 parts of 3β-acetoxy-17a-methyl-5α,22β-D-homo-C-nor - 18-norspirost-17(17α)-en in 900 parts of acetic acid is maintained with agitation under 3 atmospheres of hydrogen at 44° until hydrogen uptake indicates that reduction of the endocyclic double bond is complete (representatively, after 7 hours). Catalyst is thereupon filtered off and washed with benzene, and the benzene wash combined with the filtrate. Solvent is removed by vacuum distillation; and the residue is crystallized from a mixture of dichloromethane and methanol, using decolorizing charcoal in process. The material thus isolated in 3β-acetoxy-17aβ-methyl-5α,22β-D-homo-C-nor-18-norspirostan melting at 179–181° and further characterized by a specific rotation of −12°. The product has the formula

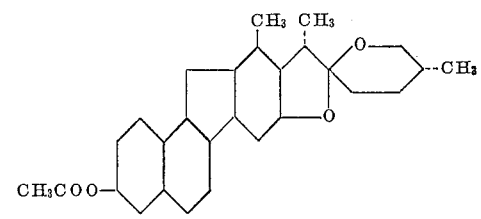

EXAMPLE 2

*3β-acetoxy-17aβ-methyl - 26 - octanoyloxy - 5α,22β - D-homo-C-nor-18-norfurost-20(22)-en.*—A solution of 134 parts of 3β-acetoxy-17aβ-methyl-5α,22β-D-homo-C-nor-18-norspirostan in 95 parts of octanoic acid and 80 parts of acetic anhydride is heated to 240° during 15 minutes and maintained at 240–250° for 20 minutes, volatile components being allowed to distil the while. The resultant mixture is cooled to room temperature and diluted with 350 parts of ether and 200 parts of water, whereupon an excess of aqueous 10% potassium hydroxide is introduced and the mixture thus obtained maintained with vigorous agitation at room temperatures for 20 minutes. The organic phase is thereupon separated and consecutively washed with water, aqueous potassium hydroxide, and water, then stripped of solvent by vacuum distillation. The residue, a mobile oil, is 3β-acetoxy-17aβ-methyl-26-octanoyloxy-5α,22β-D-homo-C-nor-18-norfurost-20(22)-en, having the formula

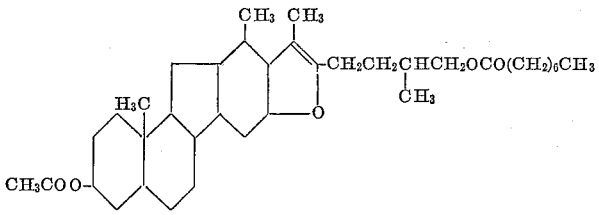

EXAMPLE 3

3β - acetoxy - 17β-acetyl-17aβ-methyl-16β-(4-methyl-5-octanoyloxyvaleryloxy) - 5α-D-homo-C-nor-18-norandrostane.—To a solution of 167 parts of 3β-acetoxy-17aβ-methyl - 26-octanoyloxy-5α,22β-D-homo-C-nor-18-norfurost-20(22)-en in 1000 parts of acetic acid and 1200 parts of dichloroethane at —5° is added, with vigorous agitation during 20 minutes, a solution of 90 parts of chromium trioxide in 800 parts of aqueous 90% acetic acid. The resultant mixture is maintained with agitation at 0° for 1 hour, at which point a solution of 100 parts of sodium bisulfite in 400 parts of water is mixed in, followed by 1000 parts of water. The mixture thus obtained is extracted with ether. The ether extract is washed with water and stripped of solvent by distillation at temperatures less than 60°. The residue is taken up in ether, the ether solution is filtered, and the filtrate is washed with aqueous potassium bicarbonate and thereupon stripped of solvent by vacuum distillation. The residue, a mobile oil, is 3β-acetoxy-17β-acetyl-17aβ-methyl-16β-(4 - methyl-5-octanoyloxyvaleryloxy)-5α-D-homo-C-nor-18-norandrostane, having the formula

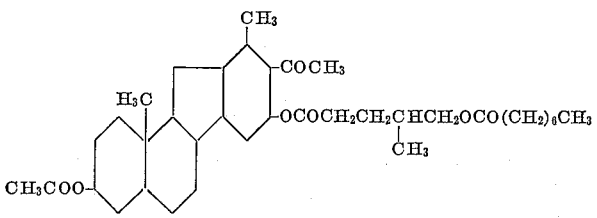

EXAMPLE 4

17 - acetyl - 17aβ-methyl-5α-D-homo-C-nor-18-norandrost-16-en-3β-ol.—A solution of 174 parts of 3β-acetoxy-17β - acetyl - 17aβ-methyl-16β-(4-methyl-5-octanoyloxyvaleryloxy)-5α-D-homo-C-nor-18-norandrostane in 1015 parts of tert-butyl alcohol and 600 parts of aqueous 20% potassium hydroxide is heated at the boiling point under reflux with agitation in a nitrogen atmosphere for 90 minutes. The tert-butyl alcohol is thereupon distilled off and the distilland partitioned between water and ether. The ethereal phase is concentrated by distillation to the point of incipient crystallization, then set aside at room temperatures until crystallization is complete. The product thrown down, filtered off and recrystallized from a mixture of acetone and petroleum ether, is 17-acetyl-17aβ - methyl-5α-D-homo-C-nor-18-norandrost-16-en-3β-ol melting at 175–178° and further characterized by a specific rotation of +54°. The product has the formula

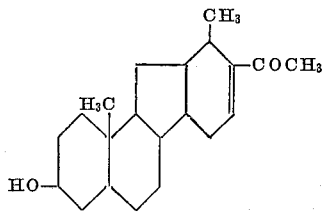

EXAMPLE 5

3β - acetoxy-17-acetyl-17aβ-methyl-5α-D-homo-C-nor-18-norandrost-16-ene.—A solution of approximately 30 parts of 17-acetyl-17aβ-methyl-5α-D-homo-C-nor-18-norandrost-16-en-3β-ol in 30 parts of acetic anhydride and 60 parts of pyridine is heated at 100° for 20 minutes, then cooled and mixed with 3 volumes of water. The precipitate thrown down is filtered off, dried in air, and recrystallized from a mixture of acetone and petroleum ether to give 3β-acetoxy-17-acetyl-17aβ-methyl-5α-D-homo-C-nor-18-norandrost-16-ene melting at 143–145° and further characterized by a specific rotation of +45°. The product has the formula

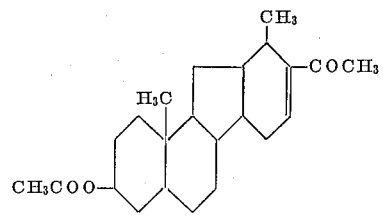

EXAMPLE 6

3β -acetoxy-17-(α-hydroxy-α,5-dimethyl-2-pyridylmethyl) - 17a - methyl - 5α-D-homo-C-nor-18-norandrost-16-ene.—An n-butyllithium solution prepared from 6 parts of lithium and 67 parts of n-butyl bromide in a total of 525 parts of anhydrous ether is cooled to —40° and maintained thereat while a solution of approximately 76 parts of 2-bromo-5-methylpyridine in 630 parts of anhydrous ether is mixed in during 20 minutes. The resultant red-brown solution is stirred 5 minutes, whereupon a solution of 36 parts of 3β-acetoxy-17-acetyl-17aβ-methyl-5α-D-homo-C-nor-18-norandrost-16-ene in 875 parts of ether is mixed in during 15 minutes, temperature being held at —40° throughout. Discoloration and formation of a whitish precipitate occurs. The reaction mixture is stirred for 1½ hours while the temperature rises to —5°, whereupon the mixture is allowed to stand overnight at room temperatures. The ether phase is separated, washed to neutrality with water, dried over anhydrous sodium sulfate, and stripped of solvent by vacuum distillation. The residual oil is chromatographed on silica gel, using benzene and ethyl acetate as developing solvents. From an eluate comprising 10% ethyl acetate in benzene, on distillation of solvent, is obtained a residue which is mixed with 225 parts of acetic anhydride and 300 parts of pyridine. The mixture is allowed to stand at room temperatures overnight, then poured into 5 volumes of water. The mixture thus obtained is extracted with ether. The ether extract is washed with water, dried over anhydrous sodium sulfate, and stripped of solvent by vacuum distillation. The residue, further purified by chromatography on silica gel (again using benzene and ethyl acetate as developing solvents), is 3β-acetoxy-17-(α-hydroxy-α,5 - dimethyl - 2-pyridylmethyl)-17a-methyl-5α-D-homo-C-nor-18-norandrost-16-ene, having the formula

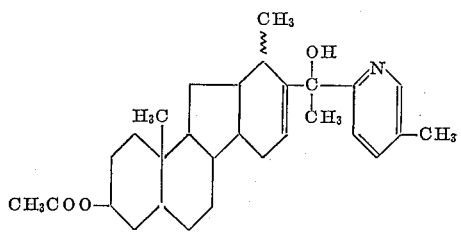

EXAMPLE 7

3-acetoxy-10,13,14,15b - tetramethyl - 1,2,3,4,4a,5,6,6a, 6b,7,14,14a,15a,15b - tetradecahydro - 15H-naphth-[2′,1′: 1,2]indeno[5,6-b]indolizine.—To a solution of approximately 3 parts of 3β-acetoxy-17-(α-hydroxy-α,5-dimethyl-2-pyridylmethyl) - 17α-methyl - 5α - D-homo-C-nor-18-norandrost-16-ene in 65 parts of dichloromethane at around 5° is added approximately 2 parts of phosphorus tribromide. The resultant mixture is maintained with agitation in a closed vessel for approximately 20 minutes, then allowed to stand at 3° overnight. Solvent is evaporated under nitrogen at temperatures of the order of 0° and to the cold semi-crystalline residue is added a solution of 3 parts of triethylamine in 40 parts of methanol. The mixture thus obtained is maintained with agitation in a closed vessel with vigorous agitation at 0–5° for approximately 4 hours. A clear yellow solution forms, following which crystallization occurs. The solid product is collected on a filter, washed with cold methanol, and dried in air to give 3-acetoxy-10,13,14,15b-tetramethyl-1,2,3,4,4a,5,6,6a,6b,7,14,14a,15a,15b - tetradecahydro-15H-naphth[2′,1′:1,2]indeno[5,6-b]indolizine melting at 184–188°. The product has the formula

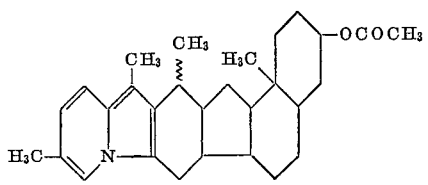

EXAMPLE 8

*3-hydroxy-10,13,14,15b - tetramethyl - 1,2,3,4,4a,5,6,6a, 6b,7,14,14a,15a,15b - tetradecahydro - 15H-naphth-[2′,1′: 1,2]indeno[5,6-b]indolizine.*—A solution of 1 part of 3-acetoxy - 10,13,14,15b - tetramethyl - 1,2,3,4,4a,5,6,6a,6b, 7,14,14a,15a,15b - tetradecahydro - 15H-naphth[2′,1′:1, 2]-indeno[5,6-b]indolizine in 70 parts of methanol and 6 parts of aqueous 10% potassium carbonate is heated at the boiling point under reflux for 1 hour, then cooled and diluted with 3 volumes of water. The precipitate which forms is filtered off, dried in air, and recrystallized from aqueous ethanol to give 3-hydroxy - 10,13,14,15b - tetramethyl - 1,2,3,4,4a,5,6,6a,6b,7,14,14a,15a,15b - tetradecahydro - 15H - naphth[2′,1′:1,2]indeno[5,6-b]indolizine, having the formula

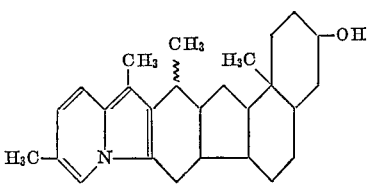

What is claimed is:
1. A compound of the formula

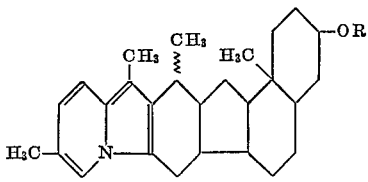

wherein R represents a member of the group consisting of hydrogen and a radical of the formula

—C-lower alkyl 2. 3-acetoxy-10,13,14,15b - tetramethyl - 1,2,3,4,4a,5, 6,6a,6b,7,14,14a,15a,15b - tetradecahydro - 15H-naphth-[2′,1′:1,2]indeno[5,6-b]indolizine.

3. 3-hydroxy-10,13,14,15b - tetramethyl - 1,2,3,4,4a,5, 6,6a,6b,7,14,14a,15a,15b - tetradecahydro - 15H-naphth-[2′,1′:1,2]indeno[5,6-b]indolizine.

4. 3β-acetoxy - 17aβ - methyl - 5α,22β-D-homo-C-nor-18-norspirostan.

5. 17-acetyl - 17aβ - methyl - 5α - D-homo-C-nor-18-norandrost-16-en-3β-ol.

6. 3β-acetoxy - 17 - acetyl - 17aβ-methyl-5α-D-homo-C-nor-18-norandrost-16-ene.

7. 3β-acetoxy-17 - (α-hydroxy - α,5-dimethyl-2-pyridylmethyl) - 17α-methyl - 5α-D-homo-C-nor - 18-norandrost-16-ene.

No references cited.

WALTER A. MODANCE, *Primary Examiner.*

UNITED STATES PATENT OFFICE
CERTIFICATE OF CORRECTION

Patent No. 3,228,951                      January 11, 1966

William F. Johns et al.

It is hereby certified that error appears in the above numbered patent requiring correction and that the said Letters Patent should read as corrected below.

In the heading to the printed specification, line 3, for "14,15a," read -- 14,14a,15a, --; column 1, line 50, and column 2, line 30, for "-17(17α)-", each occurrence, read -- -17(17a)- --; column 2, line 40, for "in" read -- is --; column 4, line 72 and column 6, line 39, for "-17α-", each occurrence, read -- -17a- --.

Signed and sealed this 20th day of December 1966.

(SEAL)
Attest:

ERNEST W. SWIDER                      EDWARD J. BRENNER
Attesting Officer                          Commissioner of Patents